United States Patent [19]

Celli

[11] Patent Number: 4,577,449

[45] Date of Patent: Mar. 25, 1986

[54] PREFABRICATED STRUCTURAL CONNECTOR FOR STEEL-FRAME BUILDINGS

[76] Inventor: Aldo Celli, Via Jacopo Palma 9, 20146 Milano, Italy

[21] Appl. No.: 555,365

[22] Filed: Nov. 16, 1983

[51] Int. Cl.[4] .............................................. E04C 3/30
[52] U.S. Cl. ....................................... 52/721; 52/648; 182/179; 248/218.4; 403/191; 403/192
[58] Field of Search .................... 211/107; 248/218.4; 403/170, 172, 173, 174, 175, 176, 187, 191, 192; 52/108–110, 298, 721, 632, 637, 638, 641, 645, 646, 648, 651, 652, 656; 182/178, 179

[56] References Cited

U.S. PATENT DOCUMENTS

| | | | |
|---|---|---|---|
| 2,221,934 | 11/1940 | Ferris | 403/170 |
| 2,990,203 | 6/1961 | Grover et al. | 182/179 |
| 3,245,188 | 4/1966 | Evans | 52/638 |
| 3,530,996 | 9/1970 | Schaffer | 211/107 |
| 3,532,369 | 10/1970 | Reilly | 403/176 |
| 3,666,298 | 5/1972 | Reilly | 403/176 |
| 3,731,958 | 5/1973 | Offenbroich | 52/656 |
| 3,858,989 | 1/1975 | Field | 403/171 |
| 4,090,798 | 5/1978 | Barton | 403/176 |
| 4,194,338 | 3/1980 | Trafton | 52/721 |

FOREIGN PATENT DOCUMENTS

| | | | |
|---|---|---|---|
| 27277 | 3/1955 | Finland | 52/648 |
| 2526890 | 11/1983 | France | 403/170 |
| 95470 | 12/1959 | Norway | 52/646 |
| 357535 | 11/1901 | Switzerland | 403/173 |
| 454555 | 7/1968 | Switzerland | 403/170 |
| 1009371 | 11/1965 | United Kingdom | 52/645 |

Primary Examiner—John E. Murtagh
Assistant Examiner—Andrew Joseph Rudy
Attorney, Agent, or Firm—Barnes, Kisselle, Raisch, Choate, Whittemore & Hulbert

[57] ABSTRACT

A prefabricated structural connector for steel-frame buildings adapted for end-to-end interconnection of vertical column members of predetermined substantially square tubular cross section and connection of at least one horizontal beam member having a central web. The connector comprises a central portion of hollow substantially square tubular cross section identical to the column cross section, and first and second hollow substantially cylindrical tubular end projections permanently joined to and projecting in opposite axial directions from the central portion. The substantially cylindrical projections have surface flats which are adapted for close telescopic insertion into an associated column end and to be welded thereto. Mounting brackets are permanently joined to the connector central portion and project laterally outwardly for connection with the web of a beam member.

10 Claims, 8 Drawing Figures

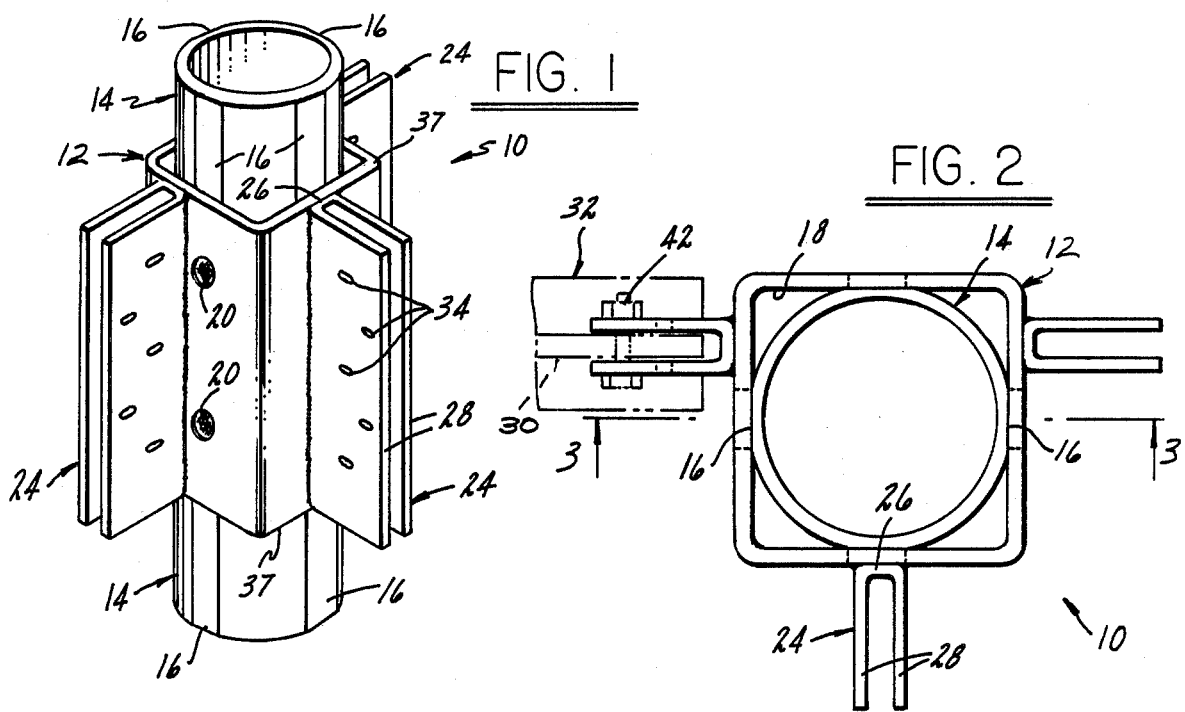
FIG. 1
FIG. 2
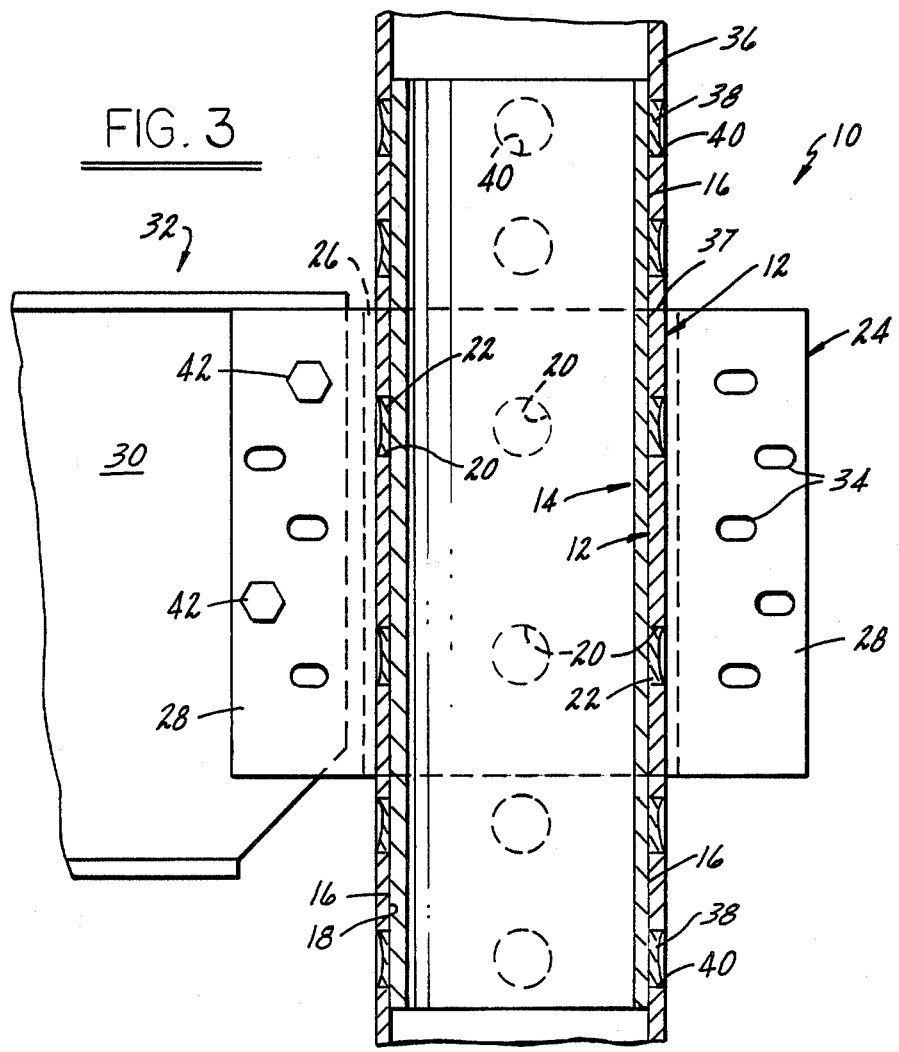
FIG. 3

PREFABRICATED STRUCTURAL CONNECTOR FOR STEEL-FRAME BUILDINGS

The present invention is directed to steel-frame building constructions, and more particularly to prefabricated structure for interconnecting vertical frame columns and horizontal frame beams.

A general object of the present invention is to provide a prefabricated structural connector for facilitating on-site interconnection of building frame vertical columns with each other end-to-end and with horizontal beams, trusses and girders. Another and more specific object of the invention is to provide a structural connector of the described type which reduces building costs by increasing on-site labor efficiency and by accommodating a simplified column design with enhanced strength-to-weight ratio. Another and yet more specific object of the invention is to provide a structural connector of standardized design which may be readily up-scaled or downscaled to accommodate differing column and beam sizes required for differing building load specifications.

The invention, together with additional objects, features and advantages thereof, will be best understood from the following description, the appended claims and the accompanying drawings in which:

FIG. 1 is a perspective view of a presently preferred embodiment of the structural connector in accordance with the present invention;

FIG. 2 is a top plan view of the connector illustrated in FIG. 1;

FIG. 3 is a fragmentary sectional view taken substantially along the line 3—3 in FIG. 2;

Figure 4:
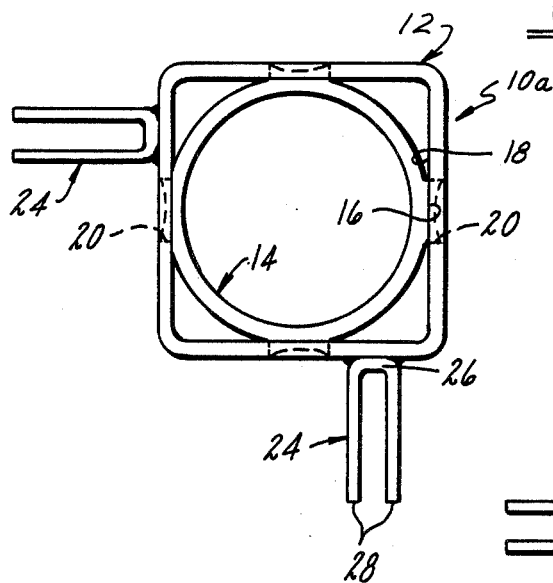
FIGS. 4 and 5 are top plan views similar to that of FIG. 2 and illustrating respective modified embodiments of the connector of the invention.

FIGS. 1-3 illustrate a structural connector 10 in accordance with a presently preferred embodiment of the invention as comprising a first section 12 of substantially square steel tube stock and a second section 14 of substantially cylindrical steel tube stock telescopically received within square section 12. The outer surface of cylindrical section 14 is machined throughout its length to provide four perpendicularly spaced flat faces 16 in diametrically opposed pairs. The dimension between diametrically opposed faces 16 and the inside dimension of section 12 between opposed flat inside faces 18 are such that faces 16, 18 are in opposed surface engagement when cylindrical section 14 is received within square section 12. The opposing ends of cylindrical tube section 14 project from the axial ends of square tube section 12. A plurality of circular openings 20 are formed in diametrically opposed arrays centrally of the flat sidewalls of tube section 12 and open onto the flat faces 16 on tube section 14. Sections 12, 14 are permanently joined to each other by arc weld joints 22 in the openings 20.

A plurality of flange mounting brackets 24 are welded each to an associated flat outer surface of square section 12 and extend along substantially the entire length of section 12 parallel to the conjoint axes of sections 12, 14. Each flange bracket 24 comprises a base 26 welded to the associated outer section face and a pair of opposed parallel flanges 28 spaced from each other by an amount adapted to receive the vertical web 30 of a horizontal structural I-beam member 32, as best seen in FIGS. 2 and 3. Flanges 28 have aligned holes 34 to receive bolts or other suitable fasteners for affixing the horizontal beam member 32 to the connector.

In use, connector 10 is adapted to join vertical column members of predetermined substantially square tubular cross section to each other end-to-end, and to attach at least one horizontal beam member to the vertical column joint. More specifically, and with particular reference to FIG. 3, the cross sectional dimensions of the central square tube section 12 are selected to correspond with the predetermined cross sectional dimension of the vertical columns 36 to be employed, such that the end portions of cylindrical section 14 may be telescopically received within the ends of columns 36 with the flat connector faces 16 in close surface engagement with the opposing surfaces of the columns and with the ends of the columns seated in coplanar engagement with the flat end faces 37 of the square section 12. Vertical columns 36 are then joined to connector 10 by arc welds 38 formed in the preformed circular openings 40 at the column ends. Connector faces 16 thus not only serve to facilitate affixation of columns 36 to connector 10, and thus to each other, but also function automatically to align columns 36 rotationally with respect to each other. The central web 30 of horizontal beam members 32, which may comprise the ends of trusses or girders, etc., are then fitted between flanges 28 and joined to connector 10 as with bolts 42. The lengths and cross sectional dimensions of the vertical column members and horizontal beam members are determined by building design and load specifications. Connectors 10 are prefabricated for each construction site in accordance with the sizes of column and beam members to be used. The column and beam members are cut and the mounting openings are formed therein either at the factory or at the job site.

Figure 5:
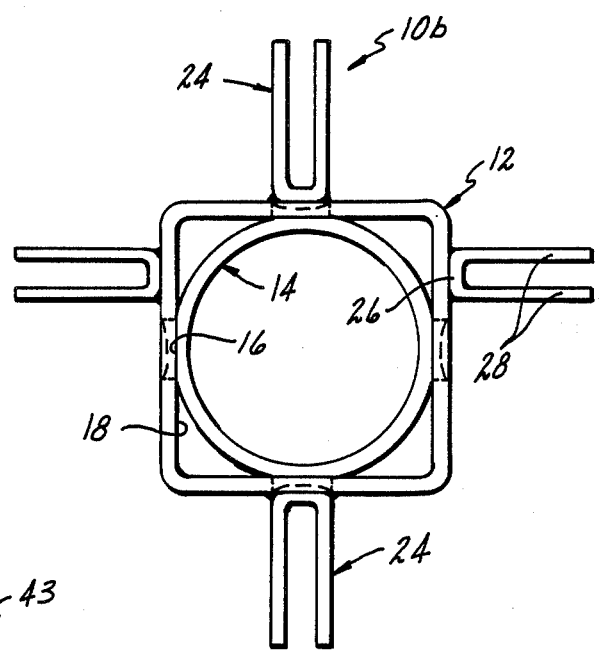
Figure 6:
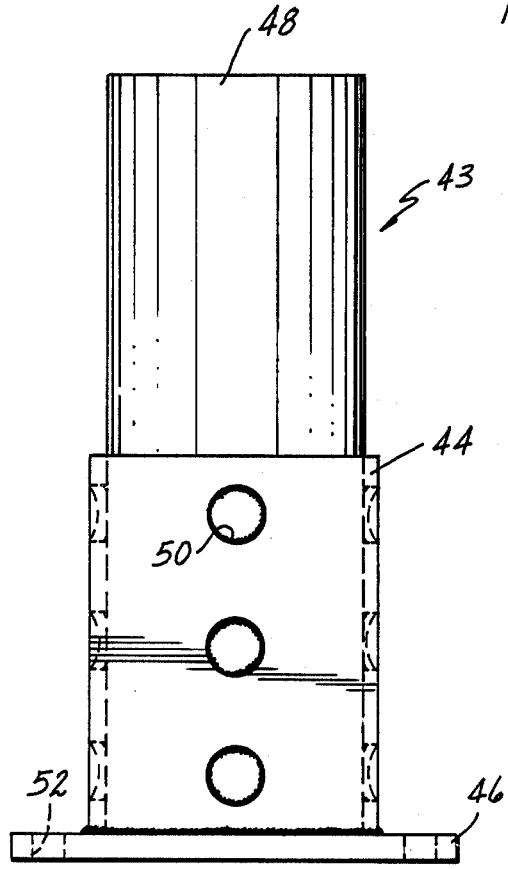
FIG. 6 is an elevational view of a column base which may be used in conjunction with the connectors of the invention.

FIGS. 4 and 5 illustrate modifications 10a and 10b to the basic preferred embodiment 10 of FIGS. 1-3 wherein a greater or lesser number of flange brackets 24 are mounted on the flat outer faces of square tubular section 12. It will be noted in FIGS. 2, 4 and 5 that some or all of the flange brackets 28 may be laterally offset with respect to the central axis of tube sections 12 and 14. The number and the arrangement of brackets 24 on the tubular section 12 are governed by the specific design of the structure being erected. FIG. 6 illustrates a column base 43 which may be used in conjunction with the structural connectors of the present invention. Base 43 comprises a first section 44 of substantially square tube stock welded at one end to a base plate 46. A second section 48 of substantially cylindrical tube stock, similar to tube section 12, is telescopically received within square section 44 and is arc welded thereto within the circular openings 50 in section 44 in the manner previously described. Base 46 includes suitable openings 52 for bolting the base to a concrete floor or the like.

Figure 7:
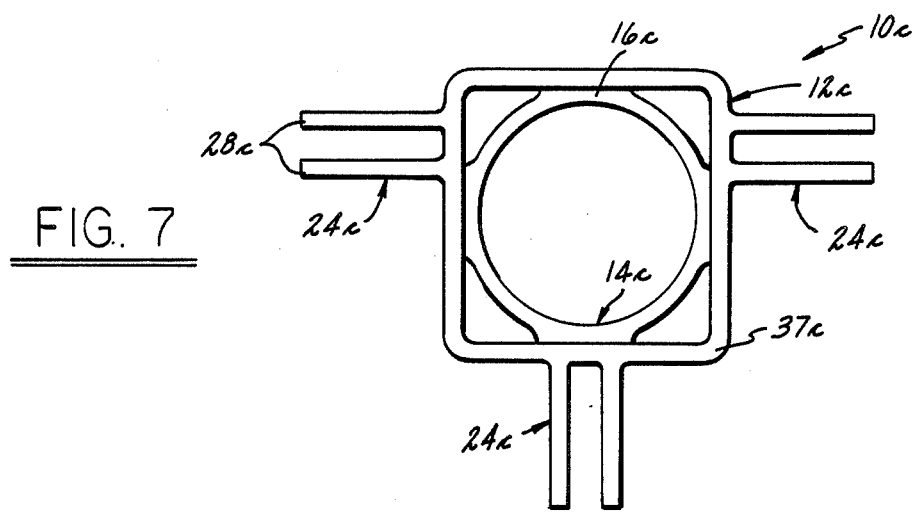
FIG. 7 is a top plan view similar to that of FIG. 2 illustrating another modified embodiment of the invention.
Figure 8:
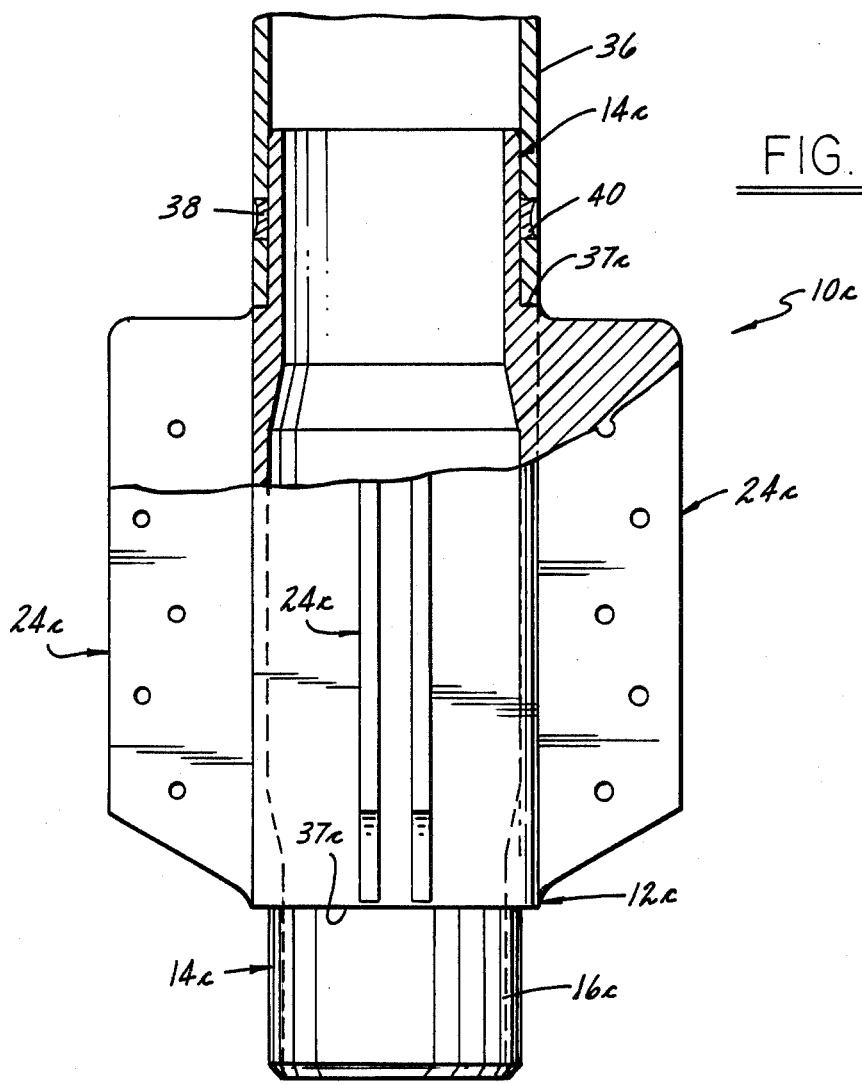
FIG. 8 is a partially sectioned elevational view of the connector of FIG. 7.

FIGS. 7 and 8 illustrate a modification 10c to the basic embodiment 10 of FIGS. 1-3 wherein the connector is provided as a one-piece integral assembly of cast iron or the like. Flange brackets 24c are cast integrally with the generally square central connector section 12c, and a pair of integral generally cylindrical projections 14c extend coaxially from opposing ends of central section 12c. Raised axially extending bosses 16c on projections 14c form the flat outwardly facing surfaces for opposed facing engagement with the inner flat surfaces of columns 36. The opposite ends of central section 12c are formed with flat faces 37c to provide seats for the ends of columns 36. Again, column 36 is joined to connector 10c by means of arc weld joints 38 within column openings 40 aligned with the flat surfaces formed by the bosses 16c. The embodiments of FIGS. 4–6 may likewise be formed as one-piece castings if desired.

There is thus provided in accordance with the present invention a simple and economical structural connector which may be completely formed in the factory and readily and efficiently used on the building site. The connector comprises a central portion of hollow substantially square tubular cross section identical to the predetermined cross section of the vertical columns with which the connector is to be used. First and second hollow substantially cylindrical tubular end projections are permanently joined to the central connector portion and project in opposite directions coaxially with each other and with the central portion. The cylindrical projections have outside diameters adapted for close telescopic insertion into associated column ends. In the preferred embodiments of the invention, the outer surfaces of the cylindrical projections include angularly spaced flat surface portions in diametrically opposed pairs extending throughout the axial length of each such projection and diametrically separated from each other by a dimension which corresponds to the distance between opposed inner surfaces of the predetermined column cross section with which the connector is adapted for use. The column ends are joined to the connector by arc welds through openings in the column which register with the flat surfaces on the cylindrical projections, whereby the flat surfaces not only serve to align the column ends with the central portion of the connector but also provide increased area for rigid structural connection of the connector to the column ends.

The connector of the invention also includes mounting brackets having flanges projecting laterally outwardly from one or more flat outer surfaces of the connector central portion and extending throughout the length thereof parallel to the connector axis. The flanges are preferably provided in parallel pairs spaced from each other to receive therebetween the central web of a horizontal beam member, such as at the end of a floor truss or a roof girder. The beam member ends are joined to the flanges, and thus to the connector and columns, by bolts or other suitable fasteners. The structural connector of the present invention may be provided as a welded assembly (FIGS. 1–5) or as a one-piece integral cast assembly (FIGS. 7–8). The basic design of the invention illustrated in the drawings may be readily upscaled or downscaled at the time of fabrication for differing vertical column and/or horizontal beam sizes to accommodate differing building load specifications.

The connector of the invention thus permits and facilitates the use of tubular columns, which are characterized by a better strength-to-weight ratio than are conventional I-beams columns. In the past, it has been difficult to align and join hollow tubular columns on the job site, and to assemble the horizontal supports thereto. The connector of the invention overcomes these difficulties.

The invention claimed is:

1. A prefabricated steel-frame building structural connector for interconnecting two vertical column members with each other end-to-end and with at least one horizontal beam member having a central web, said vertical column members having predetermined identical substantially square tubular cross sections, said structural connector comprising a central hollow tubular portion having a central axis, axially spaced flat ends perpendicular to said axis, a substantially square cross section identical to said predetermined column cross section, and four flat outer surfaces facing laterally outwardly of said axis, first and second hollow substantially cylindrical tubular end projections joined to said central portion and projecting from said ends of said central portion in opposite directions coaxially with said central portion, each said cylindrical end projection including four perpendicularly spaced outwardly facing flat surface portions disposed in diametrically opposed pairs extending throughout the length of the associated end projection and diametrically spaced from each other by a distance substantially equal to separation between opposed inner surfaces of said predetermined substantially square cross section, such that said cylindrical projections are constructed for close telescopic insertion into column members with said columns seated against said spaced ends of said central portions so as to align the column members axially and rotationally with said central portion and with each other, and at least one mounting bracket permanently joined to one flat outer surface of said central portion and having a flange projecting laterally outwardly from said one surface parallel to said axis, said flange being structured for connection to the web of a beam member.

2. The structural connector set forth in claim 1 wherein said mounting bracket comprises a pair of parallel flanges projecting from a flat outer surface of said central portion and spaced from each other to receive therebetween the vertical web of a horizontal structural beam member.

3. The structural connector set forth in claim 2 wherein each of said flanges extends substantially throughout the axial length of said central portion.

4. The structural connector set forth in claim 2 wherein said flanges have aligned openings adapted to receive fastening means for joining a beam member web to said connector.

5. The structural connector set forth in claim 2 wherein a plurality of said mounting brackets are permanently joined to and each projects outwardly from a separate flat outer surface of said central portion.

6. The structural connector set forth in claim 5 wherein at least one of said brackets is offset with respect to the axis of said central portion.

7. The structural connector set forth in claim 2 wherein said connector comprises a welded assembly which includes a first member of hollow substantially square tubular cross section, a second member of hollow substantially cylindrical tubular cross section telescopically received within said first member and welded thereto, said second member having opposed ends projecting from within said first member to form said end projections, said mounting bracket being U-shaped and having a bight portion seated against and welded to a flat outer surface of said first member.

8. The structural connector set forth in claim 7 wherein said flat surface portions extend throughout the length of said second member, and further comprising weld joints connecting said flat surface portions with said first member.

9. The structural connector set forth in claim 8 wherein said first member has a plurality of openings therein disposed in diametrically opposed axial arrays registering with said flat surface portions, said weld joints being formed as arc welds within said openings.

10. The structural connector set forth in claim 2 wherein said connector comprises an integral one-piece cast assembly.

* * * * *